…

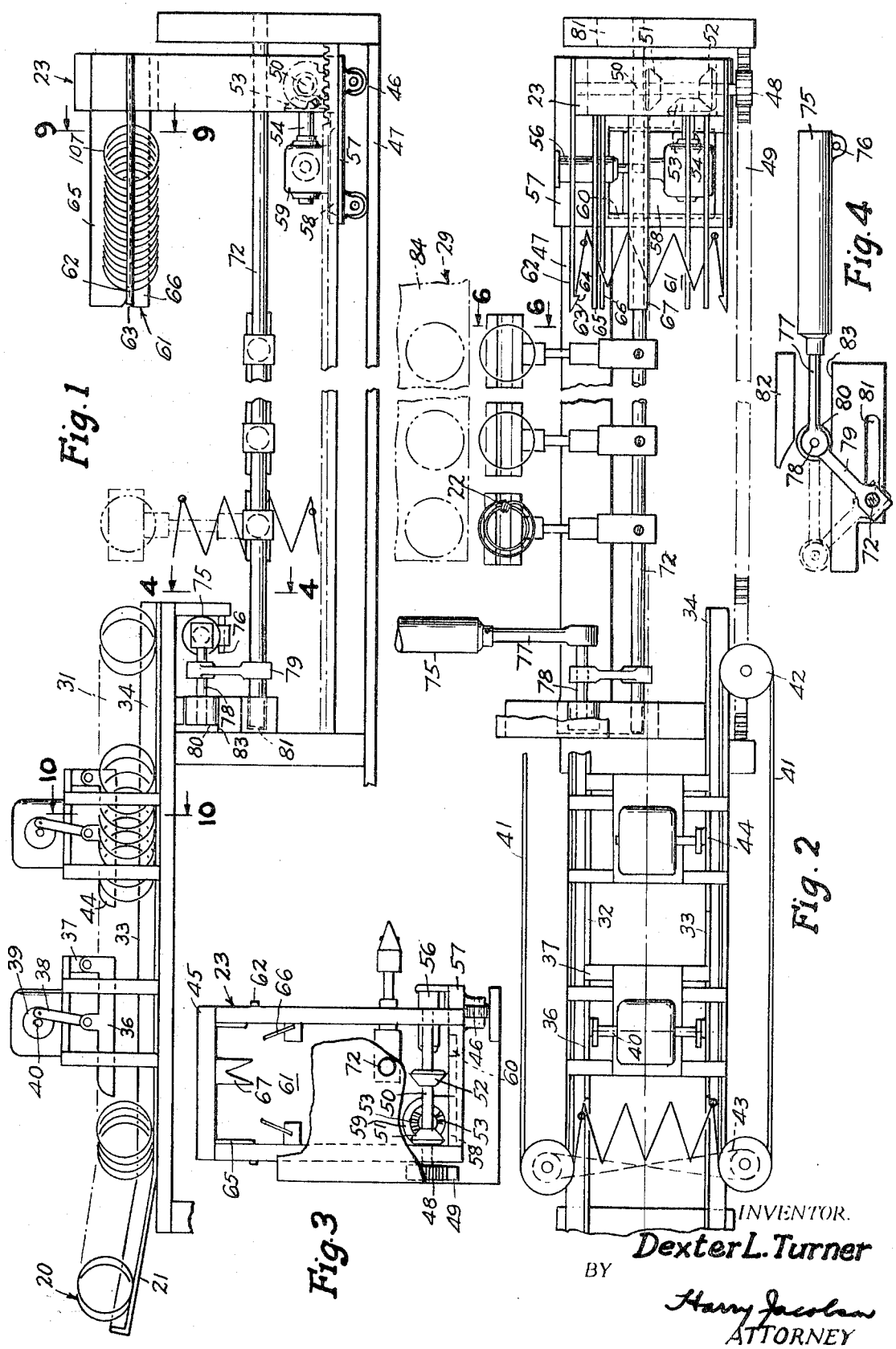

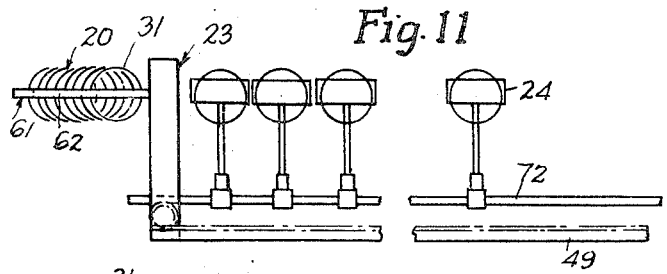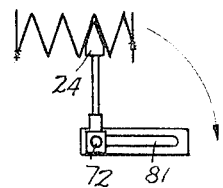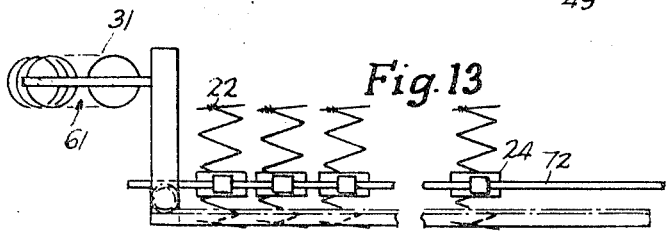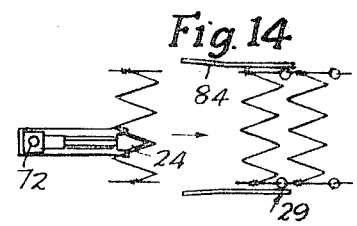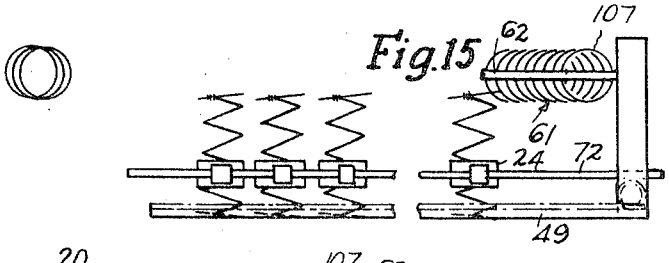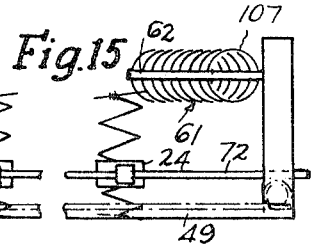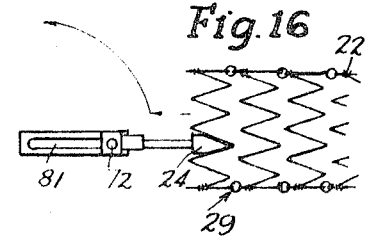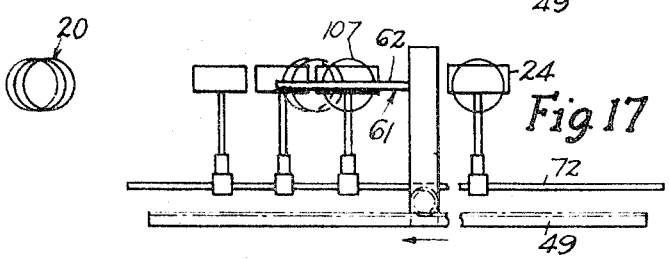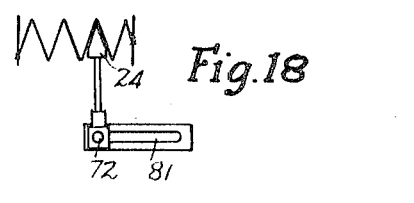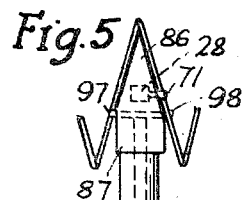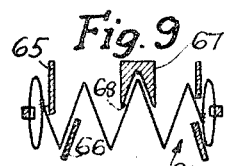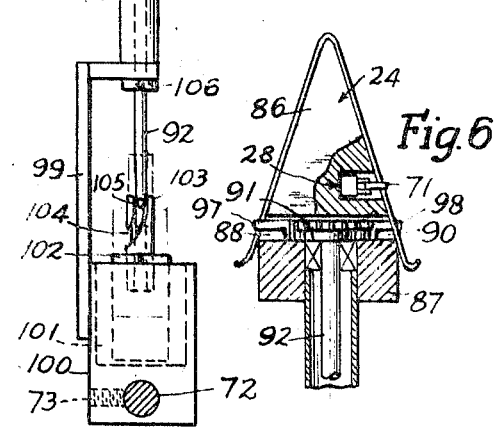

United States Patent Office 3,588,993
Patented June 29, 1971

---

3,588,993
APPARATUS AND METHOD FOR FEEDING NESTED COIL SPRINGS IN ROWS
Dexter L. Turner, Maplewood, N.J., assignor to Kay Manufacturing Corp., Brooklyn, N.Y.
Filed Mar. 21, 1969, Ser. No. 809,166
Int. Cl. B23p 19/00
U.S. Cl. 29—426                                16 Claims

ABSTRACT OF THE DISCLOSURE

A number of coil springs arranged with their axes horizontal, are removed, while still nested, from a supply of nested springs, by a reciprocating carriage. A pair of swinging fingers on each gripper of an aligned row of grippers, grips and removes only the end spring from the carriage as the carriage moves past each gripper. The row of grippers erects the row of springs and then transfers them to a conventional spring-row assembling machine.

DESCRIPTION

In what follows, the coil springs fed to the machine, such spring being those in inner spring mattresses and cushions, will be termed "Springs," though they are frequently called "coils" in the industry. The springs, as they come from the coiler, are usually delivered nested together. To make an inner spring unit, a number of nested springs have usually been removed manually from a batch or supply of such springs and inserted one at a time into a conventional assembling machine to form a row. The row is then automatically assembled to a preceding and succeeding row.

Machines heretofore devised for separating the nested springs and loading them into the assembling machine have been relatively expensive and more or less intricate.

The present invention is therefore directed to the provision of relatively simple and inexpensive means and a method for removing a number of nested springs from a batch, carrying the springs across a row of grippers each of which removes a single spring to form a row of springs, then erecting the row and forwarding it to a cooperating machine for assembly to other rows.

The various objects of the invention will be clear from the following detailed description and from the drawings, in which FIG. 1 is a diagrammatic and foreshortened elevational view of the machine showing one of the grippers upstanding in dash-dot lines in its upright position in which it is loaded with a spring, and in full lines in its horizontal position wherein the spring gripped thereby has been turned into an erect position.

FIG. 2 is a foreshortened top plan view of the machine, parts being broken away.

FIG. 3 is a side elevational view of the reciprocating carriage and adjacent parts.

FIG. 4 is a fragmentary sectional view taken on the line 4—4 of FIG. 1 showing the means for operating the gripper shaft.

FIG. 5 is a side elevational view of one of the grippers in its upright position and with the fingers thereof gripping an intermediate coil of a spring.

FIG. 6 is a fragmentary side elevational and partial sectional view on an enlarged scale of the upper end portion of a gripper showing the control switch and the gears for operating the gripping fingers.

FIG. 7 is a top plan view partly broken away of FIG. 6 showing the last spring advanced past the switch and gripped by the fingers.

FIG. 8 is a diagrammatic side elevational view of a gripper showing a spring thereon gripped by the fingers and otherwise unsupported.

FIG. 9 is a vertical sectional view of the spring-supporting means on the carriage and taken on the line 9—9 of FIG. 1.

FIG. 10 is a vertical sectional view taken on the line 10—10 of FIG. 1 and showing the means for supporting the nested springs preparatory to the advance thereof by the carriage.

FIG. 11 is a diagrammatic front elevational view of the carriage and the grippers showing the carriage picking a number of nested springs from the supply rack.

FIG. 12 is a side elevational view of the grippers of FIG. 11.

FIG. 13 is a view similar to FIG. 11 showing the grippers rotated 90° out of the path of the return stroke of the carriage.

FIG. 14 is a view similar to FIG. 12 of the grippers of FIG. 13.

FIG. 15 is a view similar to FIG. 11 showing the carriage at the end of its return stroke.

FIG. 16 is a view similar to FIG. 12 of the grippers of FIG. 15.

FIG. 17 is a view similar to FIG. 11 showing the carriage during the gripper-loading stroke thereof.

FIG. 18 is a view similar to FIG. 12 of the grippers of FIG. 17.

In general, in the illustrated embodiment of the invention, the nested springs 20, supplied by a coiler, are fed to a chute as 21 and agitated and advanced. During such advance, the usual knots 22 on the end coils are aligned. A reciprocating carriage 23 picks up a batch of predetermined number of aligned and nested springs and carries the entire batch across a row of suitably shaped heads 24 of the individual spring supports 25, the heads snugly fitting into the springs. Gripping fingers 26, 27 in each of the supports are actuated as the last spring of the batch on the carriage passes and releases a switch 28 on the support. As each support is passed, a spring is deposited and retained thereon until all the grippers have been supplied with springs. The grippers are then turned down out of the path of the carriage and advanced to deliver the row of springs held thereby to a spring-row assembling machine of any known type designated by the numeral 29.

FEEDING NESTED SPRINGS AND ALIGNING KNOTS

Referring to FIGS. 1 and 2, a supply of nested springs 20 as they come from the coiler are deposited in the preferably inclined chute 21. Said springs are arranged with their axes substantially horizontal and usually have tie knots 22 (FIG. 2) on their end coils. To guide the springs into the station 31 at which they are grasped and advanced by the carriage 23, a rack comprising a pair of transversely spaced apart angle members 32, 33 is provided. The end coils of the springs (FIG. 10) are arranged outside of and are guided by the upright legs 34 of the angle members and may slide on the horizontal legs of said members. The nested springs are suitably agitated to reduce the holding friction therebetween, by means of the agitator blades 36 pivoted to a frame 37 and vibrated rapidly by the connecting bar 38 through the crank 39 on the shaft of the motor 40.

Additional means serving to separate the nested springs and to advance them may optionally be employed. As shown, said means takes the form of a pair of endless belts 41, FIG. 2, on the pulleys 42. The pulleys 42 adjacent opposite end coils of the springs are operatively connected by the cross belt 43 and suitably driven. The inner reaches of the belts engage the end coils and aid to advance the springs to the pick-up station 31 and to separate them. Between the agitator blades and said station, a knot-aligning blade 44, similar to the blades 36, is oscillated vertically in the proper plane to engage corresponding knots on one set of the end coils of the springs and to rotate the springs until the knots 22 of corresponding end coils rest on, and consequently are aligned by, the upper edge of one of the angle members as 32 (FIG. 10). The respective knots of the end coils of each spring are usually out of alignment with each other, that is, one knot is not in the same circumferential position as the other. Orientation of one set of knots of the supply of springs is sufficient to properly align both sets of knots. Should the springs have been turned to a position wherein the knots are too low to be accessible to the blade 44, the disoriented spring may readily be removed manually, it being accessible in the space of the rack between the agitator and the knot-aligner. It will be understood that the knots separate the coils of one spring from the coils of the adjacent springs sufficiently to enable a suitable hook to be inserted therebetween at the pick-up station 31, where a predetermined number of springs, constituting the batch to be transferred, are grasped and removed from the supply of springs on the rack by the carriage 23.

CARRIAGE

The carriage is mounted for horizontal reciprocation toward and from the pick-up station 31. In the form illustrated, the U-shaped frame 45 of the carriage (FIG. 3) is supported on one side by the rollers 46 running on the fixed base member 47 of the machine frame or on suitable rails, not shown, the carriage frame 45 being supported on the other side thereof by the pinion 48 meshing with the fixed gear rack 49. On the pinion shaft 50 are fixed the bevel gears 51 and 52 spaced apart enough to permit the bevel shift gear 53 on the motor shaft 54 to be shifted from one to the other thereby to reverse the direction of rotation of the pinion and the consequent direction of the stroke of the carriage. The air cylinder 56, fixed to the base 57 of the carriage frame and movable therewith, shifts the plate 58 on which the motor 59 is mounted, the plate being guided by suitable grooves 60 in the base 57. At the end of the stroke of the carriage in each direction, the air cylinder becomes effective to shift the motor plate and motor 59 thereby to shift the gear 53 and to reverse the direction of the stroke of the carriage. It will be understood that reversal of the stroke may obviously be attained by various other known means and that this invention is not intended to be limited to the precise means shown for that purpose.

SPRING BATCH MAGAZINE

In the position of the carriage shown in FIGS. 1, 2, 15 and 16, the grippers 25 are horizontal and have not as yet forwarded the row of erected springs thereon to the assembling machine 29. However, the carriage magazine 61 has picked up a batch of springs, preparatory to transferring them to the grippers when the grippers return and rise to the loading positions thereof shown in FIGS. 17 and 18. Means are provided on the carriage magazine for grasping, and pulling out of the supply of nested springs at the station 31, a batch of predetermined number of springs. As best seen in FIGS. 1–3, said means comprises the pair of yieldable elongated spring hooks 62 in strip form each terminating in a hook 63 having a bevelled inner surface 64 at its free end and secured to the carriage frame 45 at its other end (FIG. 2). Aiding the spring hooks 62 to support and position the batch of springs, are a number of blades and a guide. The upper blades 65 (FIGS. 3 and 9) extend downwardly from the top of the carriage frame and toward the left from the sides of said frame as viewed in FIGS. 1 and 2, and are adapted to engage the end coils. The lower inclined blades 66 engage the next succeeding coils adjacent the end coils. A guide 67 is secured to the under side of the top of the carriage frame and also extends from the frame toward the pick-up station. Throughout its length, the guide is recessed with a wedge-shaped groove 68, the side walls of which taper at about the same angle as that part of an intermediate coil of a spring in order to fit and guide said coil during its entrance into and withdrawal from the magazine, and to cooperate with the similarly wedge-shaped gripper heads 24.

As the carriage nears the end of its gripper-loading stroke in the direction of the arrow of FIG. 17 and into the position of FIG. 11, the various supporting and guiding parts of the magazine 61 begin to function. These parts are preferably just long enough to enter and grasp the same number of springs as there are operating grippers 25 which is also the number of springs required to make up a row of the inner spring structure to be ultimately assembled. The bevelled faces 64 of the hooks 63 slide over the outside of the coils and cam the spring hooks away from the individual coils they pass until the carriage is halted, whereupon the hooks enter the space created by the knots between the corresponding coils of adjacent springs, and grasp these coils immediately to the right of the hooks as seen in FIG. 13. At the same time, the guide 67 rides over the top of a selected intermediate coil 69 of each spring, which coil is later to be engaged by the gripper, while the pairs of blades 65, 66 coact with each other to maintain the springs in their proper oriented positions as the blades enter the magazine and later as the springs slide out of the magazine on to the grippers.

GRIPPER OPERATING MECHANISM

Optionally, the magazine may load each of the individual gripper heads 24 with a spring on the return stroke of the magazine to the right as viewed in FIGS. 11 and 13, or instead such loading of the heads may take place on the stroke of the magazine to the left as shown in the drawings. In the former case, the position of the switch 28 in each head is changed, from that shown in FIG. 7, by placing the pivot 70 of the switch arm 71 at and moving said arm to, the other end of the head, as will now be obvious. As shown however, the carriage and its magazine are returned to the position shown in FIG. 15 before the loading stroke indicated in FIG. 17 occurs. It therefore becomes advisable to swing the grippers out of the path of the carriage (see FIGS. 13–16) on the return stroke of the carriage away from the pick-up station (FIG. 11) to the position shown in FIG. 15. For this purpose, each of the grippers is adjustably mounted on the shaft 72, as by means of the set screw 73, to swing with said shaft and yet to allow the heads to be spaced apart in accordance with the required spacing of the springs in the rows of different spring structures.

Referring now to FIGS. 1–4, the air cylinder 75 for operating the gripper shaft is preferably pivoted as at 76 near the closed end thereof, while the piston rod 77 at its other end is connected to the shaft 78 on which are also mounted one end of the crank 79 as well as the roller 80. The other end of the crank is fixed to the gripper shaft 72, the extreme ends of said shaft being slidable in the grooves 81 in upright parts of the machine frame. A fixed guard 82 is arranged to guide the roller 80 and to insure its return to the position in which it is in contact with the edge 83 of the frame during the stroke of the piston rod 77 and the roller 80 from the full line position to the dash-dot position of FIG. 4. Said stroke rotates the gripper shaft 90° and swings the grippers from the erect positions of FIGS. 11 and 12 to that of FIGS. 13–16 in which the grippers are horizontal but the initially horizontal springs carried thereby have been erected in the direction of the arrow of FIG. 14 and also advanced into the space between the spring compressing plates 84 of the assembling machine 29. The air cylinder is timed, in the usual manner, to swing the grippers down by retracting its piston rod 77 after the magazine has grasped its quota of springs and is ready to start its return stroke. At the end of said return stroke, the piston rod is extended and the grippers erected to place the empty heads 24 in the path of the guide 67 of the magazine.

GRIPPERS

Means are provided on each of the gripper heads for removing the then trailing spring of the batch held by the magazine 61 during its gripper-loading stroke, and for retaining said spring on the head until the row of such springs has been delivered to the assembling machine whereupon the row of springs is released. As shown, each gripper head is loaded with such a trailing spring on the movement of the magazine in the direction of the arrow of FIG. 17, though the gripper loading stroke may be easily reversed, if desired. Obviously, as each trailing spring is removed by a head, the next spring in the batch becomes the trailing spring for the heads until all of the springs have been removed from the magazine as will later be explained in greater detail. As best seen in FIGS. 5–7, the gripper head 24 is preferably made of several parts, namely, the wedge-shaped part 86, the lower shaft-supporting part 87 and the relatively narrow end spacers 88, 89 holding the parts 86 and 87 apart enough to provide the slot 90 in the head.

A pinion 91 on the pinion shaft 92 is arranged approximately at the center of the slot and meshes with the teeth of a pair of finger members 93, 94 which are pivoted in the slot by pivots 95 and 96 respectively. On the member 93 is the relatively narrow hook-like coil-gripping finger 97. A similar finger 98 is carried by the member 94, at least one of the fingers as 98 being narrow enough to pass between the corresponding intermediate coils of the last two springs of the batch in the magazine 61. As shown in FIGS. 5 and 6, each head is suitably supported by a bracket 99 secured to the casing 100 for a solenoid 101 having an armature 102 coaxial with the pinion shaft. Said casing 100 is fixed adjustably to the gripper shaft 75. Secured to the armature and reciprocating axially therewith, is the hollow cam cylinder 103 having the helical cam slot 104 therein and receiving the lower end of the pinion shaft. A pin 105 projecting from the shaft is inserted into the cam slot and rotates the pinion shaft and the pinion thereon on the reciprocation of the armature and the consequent angular movement of the pin. The collar 106 on said shaft engages the under side of the bracket 99 and prevents outward axial movement of the shaft while the pinion prevents axial movement in the opposite direction.

The solenoid is connected electrically to the switch in the head and its armature 102 is projected axially and outwardly out of the casing when the switch arm 71 of the normally open switch 28 has been freed of springs and extends out of the head slot 90 as seen in FIG. 7. It will be understood that though the springs in the magazine are close together, they are spaced apart substantially uniformly by the knots in the end coils and are held well enough to prevent displacement thereof in the magazine, but not tightly enough to prevent the gripping fingers 97, 98 on the heads from sliding the springs off the supporting blades 65, 66. It will also be understood that the guide 67 of the magazine cooperates with the inclined lateral surfaces of the heads to hold the springs therebetween and to move therewith until further movement of the trailing spring of the batch is prevented by the gripping fingers.

In the positions of the parts shown in FIGS. 5–7, the gripping fingers 97–98 and the mechanism for actuating the fingers have acted to project the fingers out of the slot 90 and to grasp the trailing spring at approximately diametrically opposite points of the intermediate coil 69 thereof. Prior to such projection of the fingers from the head slot, those springs of the batch ahead of the trailing spring 107 have pressed the free end of the switch arm 71 back into the head slot. The arm is long enough and the springs are close together enough to keep the arm retracted within the slot against the action of its spring 108 until the trailing spring passes the free end of the arm. The retracted switch arm closes the switch 28 which in turn causes the solenoid 101 to extend its armature upwardly as viewed in FIG. 5 and from the position shown in that figure, together with the cam cylinder. As the pin 105 rotates in the cam slot, the pinion shaft and its pinion 91 are rotated in a clockwise direction to swing the finger members 93, 94 and to retract the fingers. The fingers of any individual head remain retracted only so long as there is a passing spring to press upon the controlling switch arm of said head. When there is no longer any such spring to pass the arm except the trailing spring of the diminishing batch, the arm is ready to resume its normal projected position out of the head slot. This occurs immediately after the passage of the trailing spring past the free end of the arm. The switch then opens, the solenoid armature is withdrawn downwardly from its upper position into the position shown in FIG. 5, the pinion rotating counterclockwise and the fingers grasping the coil 69 of the trailing spring.

As the magazine continues its movement, said coil is firmly pressed against the lateral surfaces of the head, which surfaces closely engage the coil. The fingers are shaped and so engage the coil as to urge opposite points of the coil in opposite directions thereby to hold the spring firmly on the head as the magazine moves on to the next heads, no other support for the removed spring being required. The springs are thereby deposited, one by one, on the gripper heads in a row of springs spaced apart the required adjusted distances ready for transfer to the assembling machine by the mechanism and in the manner aforesaid as indicated in FIG. 17. Suitable means close the switches 28 in the row of grippers to retract the fingers and to release the row of springs when said springs have been delivered to the assembling machine.

The magazine continues its gripper-loading stroke until it reaches the pickup station where it again grasps its quota of springs ready for the repetition of the cycle. It will be understood that suitable switches, solenoid valves, relays and the like, control the sequential operation of the various mechanisms in a manner which is well understood and need not be further described nor illustrated.

It will now be seen that the mechanism and method for separating and transferring nested springs disclosed herein are relatively simple, rapid and inexpensive and that the various objects of the invention have been adequately attained.

While certain specific forms of the invention have herein been shown and described, various obvious changes may be made therein without departing from the spirit of the invention.

I claim:

1. In a machine for separating nested coil springs and for transferring said springs in a row to a receiver for said row, spring-gripping and transferring means comprising a row of spaced apart grippers each terminating in a shaped head adapted to engage an intermediate coil of a nested spring and gripper-loading means including a carriage for holding a batch of nested springs with the axes of the springs substantially horizontal and for moving said batch on along and past the heads.

2. The machine of claim 1, each of the grippers including means on each of the heads for removing an individual spring from the batch and for gripping said spring.

3. The machine of claim 2, the spring-removing means of successive heads gripping only the trailing spring of the batch as said batch moves past the respective heads.

4. The machine of claim 2, the heads being wedge-shaped, the spring-removing means comprising a pair of opposed fingers carried by each head and means normally projecting the fingers out of the head in position to grip corresponding intermediate coils of the springs of the batch, the finger-projecting means retracting the fingers into the head in response to the presence of passing springs and only until the trailing spring of the batch passes a predetermined point on the head.

5. The machine of claim 2, means for swinging the grippers to erect the springs held by said grippers and for advancing the grippers and the erected springs toward a receiver for the springs.

6. The machine of claim 1, the gripper-loading means depositing a spring on each head to form a row of spaced apart springs, and means for advancing the grippers together with the row of springs to a receiver of said row.

7. The machine of claim 1, means for reciprocating the carriage to load each of the heads of the grippers with a spring on the gripper-loading stroke of the carriage and means for swinging the grippers out of the path of the return stroke of the carriage and thereby erecting the springs.

8. The machine of claim 4, means for reciprocating the carriage, means for swinging the grippers out of the path of the gripper-loading stroke of the carriage and for erecting the row of springs on the heads of the grippers and for also advancing the erected springs to a receiver for the row.

9. The machine of claim 4, means for agitating a supply of nested springs having knots in the end coils thereof and for aligning said knots, said agitating and knot-aligning means preparing the springs for transfer by the carriage to the grippers, means for reciprocating the carriage, means on the carriage for removing a batch of aligned nested springs from the supply of such springs on one stroke of the carriage and for releasing the successive trailing springs of said batch from the carriage for deposit of one trailing spring on each of the heads of the respective grippers in succession when the trailing spring is gripped by the fingers, the finger-projecting means including a switch on each of the heads engaged successively by the respective springs on the carriage and causing retraction of said fingers when so engaged, means for swinging the loaded grippers out of the path of the carriage to erect the springs gripped by the heads and for advancing the said spring in a row to a receiver for the row.

10. The machine of claim 4, each of the heads having a slot therein, a pinion in said slot, gear teeth on each of the fingers meshing with said pinion, means for rotating the pinion, a pivot for each finger in the head, and a switch responsive to the passage of intermediate coils of the springs therepast to control the angular movement of the pinion and the consequent projection and retraction of the fingers out of and into the slot.

11. The machine of claim 1, each of the heads being wedge-shaped, pivoted and toothed fingers in each head, a pinion for oscillating the fingers, and means responsive to the passage of an intermediate coil of a spring past a determined point on the lateral surface of the head for rotating the fingers angularly in one direction to retract the fingers in the slot of the head and in the other direction normally to project the fingers out of the slot and into position to grip said coil.

12. The machine of claim 1, the heads being wedge-shaped, means for reciprocating the carriage during the spring-loading stroke thereof past the heads thereby to move the intermediate coils of the batch of springs along the lateral surfaces of the heads, the heads being upright during said stroke, means on each of the heads to grip and remove from the carriage the trailing spring of the batch as the batch passes a head, means on the carriage to grasp a selected number of nested springs from a supply of such springs at the end part of said spring-loading stroke, and means to rotate the row of grippers and the heads into a horizontal position and thereby to erect the row of springs on the heads prior to the return stroke of the carriage and for advancing the row of grippers toward a receiver for the row of springs held by the grippers.

13. The method of separating and transferring nested coil springs comprising removing a batch of such springs from an end part of a supply of nested springs, passing corresponding intermediate coils of the nested batch over a row of grippers, and depositing the trailing spring of the batch on each gripper successively as the batch passes the respective grippers to form a row of separated springs.

14. The spring-separating method of claim 13, erecting the row of springs and advancing the erected row to a receiver for the row.

15. The spring-separating method of claim 14, the springs being knotted, agitating the supply of nested and knotted springs and aligning the knots thereof, replenishing the supply of springs as the supply diminishes, and advancing the supply to the point of removal of the batch preparatory to the deposit of the springs on the grippers.

16. The spring-separating method of claim 14, maintaining the axes of the springs in the batch in a horizontal position until the row is erected, releasing the row of erected springs from the grippers when said row has reached the receiver and restoring the grippers to the positions wherein said grippers receive another row of springs from a succeeding batch of such springs.

References Cited
UNITED STATES PATENTS

| 1,861,429 | 5/1932 | Schneider et al. | 53—114 |
| 3,386,561 | 6/1968 | Spuhl | 29—200X |

FRANK T. YOST, Primary Examiner

U.S. Cl. X.R.

29—200; 53—114; 198—32; 214—1